Patented Apr. 15, 1941

2,238,637

UNITED STATES PATENT OFFICE 2,238,637

INSULATING OIL COMPOSITION

Peter J. Gaylor, Staten Island, N. Y., assignor to Standard Oil Development Company, a corporation of Delaware No Drawing. Application August 18, 1938, Serial No. 225,578

3 Claims. (Cl. 260—32)

The present invention relates to improved high boiling mineral oil compositions and is especially concerned with a viscous high boiling petroleum cable insulating composition. The composition of the present invention comprises a heavy viscous mineral oil containing a high molecular weight aromatic condensation product secured by condensing aromatic compounds, especially hydrocarbons, as for example, aromatic compounds such as methyl naphthalene, acenaphthene, phenanthrene and especially naphthalene and its partially hydrogenated products, as for example, dihydronaphthalene and dihydrobenzene or their homologs. Aromatic ethers, aryl-alkyl ethers, aryl-alkyl hydrocarbons, and other aromatic compounds are also suitable.

It is well known in the art to utilize mineral oils, especially petroleum oils, as various insulating oils. These oils are used to impregnate, coat and paint various types of electrical equipment. For example, a particularly important commercial use of these oils is in the coating of electrical transmission lines. In this service the oils are placed under severe working conditions with the result that most of the oils now employed are not entirely satisfactory due to the fact that deterioration occurs and failure of the insulation results. A mixture of mineral oil and rosin, a composition widely employed, usually fails due to condensation and separation of the rosin with age. The composition becomes brittle, resulting in cracking and breaking with subsequent break-down of the di-electrical strength. Other substances, such as pure mineral oil or petrolatums, have relatively low di-electric losses, but after in service for a period of years the di-electric losses are as high or even higher than losses with rosin mixtures.

The main difficulty with the use of most oils is the formation of gas due to the effect of a corona discharge induced by the high voltage employed. This gas forms film surfaces in the di-electric oils which accelerate the action of the silent electric discharge with the consequent production of large amounts of gas, thereby causing rupture of the di-electric coating and other failures.

I have now discovered an improved insulating composition which is particularly adapted for electrical transmission lines, as for example, for use in insulating electrical cables. The composition of the present invention comprises a petroleum oil and an aromatic hydrocarbon condensation product. This composition is entirely homogeneous at all temperatures. Settling or sludging of the composition does not occur at any temperature. The viscosity of the composition may be adjusted to increase rapidly at lower temperatures by adjusting the amount of resinous body incorporated. Compositions of the present invention are also not subject to any substantial amount of oxidation. One valuable characteristic of the present type of compositions is that the viscosity index of the composition is lower than the viscosity index of the petroleum oil in which the resinous body is incorporated. Thus these compositions are extremely desirable for use as cable insulating oils. A preferred composition comprises a petroleum insulating oil and a condensation product of an aromatic hydrocarbon, particularly a polymer secured by condensing naphthalene, acenaphthene, phenanthrene, or other suitable aromatic hydrocarbon and secured preferably by condensing the aromatic hydrocarbon by means of an alkali metal, as for example, with sodium. The composition of the present invention may be readily understood by the following description.

Organic resins or polymers are generally classified in the art as linear and non-linear. The former are compounds wherein monomeric units attach to each other in substantially a straight line. These compounds when soluble have the peculiar property of increasing the viscosity index of their solvents. Non-linear products constitute a class of compounds wherein the monomeric units are condensed in a compact or cyclic form with each other or on to one or more compounds of a lower polymer. This invention is concerned with compounds of this latter class having molecular weights of over about 200 and preferably above 400 and higher. This invention is concerned particularly with V. I.-decreasing resins having molecular weights in the above-stated range which are substantially soluble in petroleum oils. The aromatic condensation products employed in the present process, especially those containing fused nuclei, might be considered as compounds wherein condensation is carried out by the jointage of the aromatic nuclei.

This polymer of an aromatic compound is preferably prepared by first reacting the aromatic compounds with an alkali metal in the presence of a solvent, followed by hydrolysis with a suitable agent under carefully controlled conditions. Any solvent giving satisfactory results, such as liquid ammonia, diethyl ether or triethylamine, may be employed. However, it is preferred to use aliphatic ether solvents, such as dimethyl ether or methyl ethyl ether or dimethyl ether of ethylene glycol. After hydrolysis the polymer is secured from the reaction mixture by first filtering out the caustic hydroxide or carbonate formed, followed by evaporation of the solvent and then distilling to secure the aromatic polymer.

In the preparation of an insulating oil, initial petroleum oils are selected which have the desired properties, as for example, a petroleum oil having optimum insulating oil properties, as to dielectric strength, viscosity, life, color, flash and fire points and viscosity index. Hydrocarbon oils having Saybolt viscosities of 80 to 2000 or more at 100° F. are suitable base stocks.

An extremely desirable characteristic of the composition consisting of aromatic polymers secured by the above-described method and the types of insulating petroleum oils as described above, is that the composition has a lower viscosity index than the initial petroleum oil.

The importance of this is realized when the problems involved in the manufacture of insulating oils are considered. In addition to having the necessary insulating oil properties as enumerated above, it is essential that the insulating oil have a satisfactory viscosity and viscosity index characteristics. In a cable oil, for example, it is necessary that the viscosity be such that thorough impregnation will occur at the treating temperatures, usually about 150° to 270° F. At these temperatures it is preferable that the Saybolt viscosity be below 100 seconds, preferably below 50 seconds. The oil must also have a relatively high Saybolt viscosity at temperatures from about 75° to 125° F., preferably above 400 seconds, to prevent flowing and to give satisfactory protection against the elements, and must be sufficiently pliant that it will not crack or break with bending under normal laying or operating conditions at temperatures from 0° to −40° F. or lower.

The composition of this invention is homogeneous, having no tendency to separate or coagulate with age or use. The viscosity and viscosity index may be optimumly adjusted for the particular conditions of service to which it is to be applied by selectively adjusting the initial materials and the quantity of polymer dissolved in the composition. The quantity of condensation product added may be in the amounts of 0.1, 5.0, 10.0 or even 50%.

The following specific examples give one method of manufacturing an aromatic polymer and show the effect of adding approximately 10% of the polymer to a Coastal oil.

*Example 1*

To a solution of naphthalene dissolved in dimethyl ether of ethylene glycol under an atmosphere of nitrogen or hydrogen, is added metallic sodium, preferably in the form of strips, while stirring vigorously and maintaining the temperature at from about 60° F. to 86° F., preferably at about 75° F. As the reaction proceeds and the solution becomes visibly green, small amounts of water or alcohols are added at such a rate that the green color of the solution never disappears. Suitable means of cooling or maintaining the temperature may be used. This solution is then filtered to remove the precipitated sodium hydroxide and then distilled at atmospheric pressure to remove the solvent ether, followed by distilling in vacuum at a pressure from 1 to 8 millimeters of mercury, to completely remove the entire volatile material, care being taken to exclude oxygen if a light colored product is desired. The residue polymer of this vacuum distillation solidifies upon cooling. This residue polymer has a molecular weight of at least 400, a melting point of 97° to 103° C., and a density of about 1. This polymer is added to a Coastal oil having the viscosity of 205 Saybolt at 100° F., 43 at 110° F., and a viscosity index of 0. A composition having the following viscosity and viscosity index is secured:

*Table 1*

|  | Viscosity at— | | |
|---|---|---|---|
|  | 100° | 210° | V. I. |
| Coastal oil | 205 | 43 | 0 |
| Coastal oil+10% naphthalene condensation product | 423 | 50.1 | −10 |

The portion of the distillate distilling at a pressure of 1 to 3 millimeters of mercury at a temperature of from 200° to 230° C. may also be used. This fraction is a viscous liquid and has a molecular weight of about 260 and higher. This viscous polymer may be further treated by the above-described process to produce a higher molecular weight resinous solid polymer.

*Example 2*

In order to determine the electrical stability as affected by the addition of the polymer of the present invention, the following tests were made. A highly refined white oil was subjected to the influence of an electrical discharge. The amount of gas evolved was determined. Similar tests were then run on blends of the highly refined white oil containing various percentages of the polymer. The results of these tests were as follows:

*Table 2*

| Oil | Cc. gas formed in 4 hours at 20° C. 15,000 volts discharge |
|---|---|
| Highly refined white oil | 2.56 |
| Ditto +1% polymer | 2.07 |
| Ditto +5% polymer | 1.25 |
| Ditto +10% polymer | 0.59 |

The above values are all experimental, being dependent upon the type and size of apparatus used, the volume of oil sample used, and the like. However, for the purposes of comparison, they show that the presence of 10% of the polymer of the present invention reduces the gas formation by 80%.

The polymer prepared in accordance with the above-described method may be used as such, or hydrogenated or further condensed by itself or with other compounds, and added to any insulating or lubricating oil or grease having the desired characteristics. Suitable insulating oils should have a minimum flash of at least 275° F., preferably above 400° F. or higher. The viscosity indices should vary from about 10 to −50 or lower, while the gravity varies from approximately 15 to 30. The di-electric strength at 86° F. should be approximately 30 to 40 kilovolts per centimeter.

The composition may be chlorinated or fluorinated to render it less inflammable. Waxes or free sulfur may be also added. Pour or oxidation inhibitors, dyes, thickeners, soaps, (such as metal naphthenate, aluminum stearate, etc.), oiliness agents, colloidal or suspended materials, metallo-organic compounds may likewise be added, as well as substances such as cetyl alcohol, to prevent or reduce sludge formation, or materials such as styrene or polyisobutylene to improve penetrative characteristics. This composition may also be employed to impregnate fibrous materials for di-electric use.

This invention is not to be limited by any theory of operation, but only by the following claims in which it is desired to claim all novelty insofar as the prior art permits.

I claim:

1. An improved oil composition consisting of an insulating hydrocarbon oil and a soluble condensed polynuclear hydro-aromatic compound having a molecular weight above about 200, having the property of lowering the viscosity index of the oil and lowering the gas evolution of the oil under the influence of an electric discharge.

2. An improved cable insulating composition consisting of an insulating oil and a non-linear polynuclear hydro-aromatic polymer having the property of lowering the viscosity index of the oil and lowering the gas evolution of the oil subjected under the influence of an electric discharge.

3. An improved insulating composition consisting of a highly refined insulating white oil and a condensed polynuclear hydro-aromatic polymer having a molecular weight above about 200, a density of about 1, melting point of about 97–103° C., and having the property of lowering the viscosity index of the oil and lowering the gas evolution of the oil when subjected under the influence of an electric discharge.

PETER J. GAYLOR.